July 16, 1940.　　　　　C. MARCUS　　　　　2,208,299
EMERGENCY THROTTLE-CONTROL MEANS FOR AIRCRAFT ENGINES
Filed Sept. 18, 1937
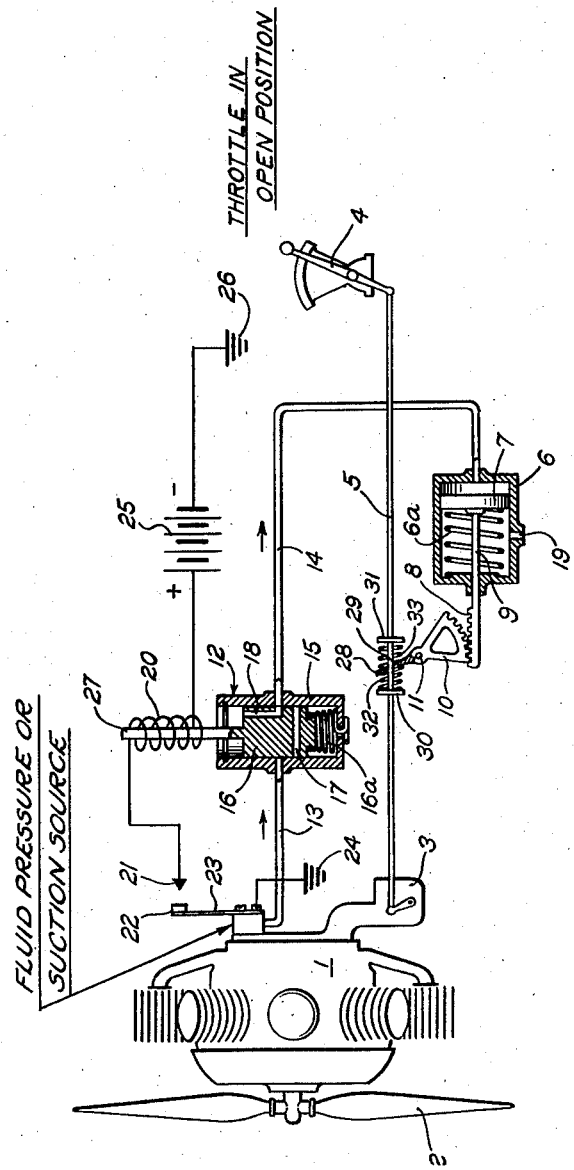
INVENTOR.
*Charles Marcus*
BY *Stephen Cerstvik*
ATTORNEY.

Patented July 16, 1940

2,208,299

UNITED STATES PATENT OFFICE 2,208,299

EMERGENCY THROTTLE-CONTROL MEANS FOR AIRCRAFT ENGINES

Charles Marcus, New York, N. Y., assignor to Eclipse Aviation Corporation, East Orange, N. J., a corporation of New Jersey Application September 18, 1937, Serial No. 164,568

5 Claims. (Cl. 123—198)

The present invention relates to means for automatically controlling the throttle of an engine, and more particularly to means for automatically throttling an aircraft engine in an emergency such, for example, as when the propeller of the engine is sheared off or seriously damaged during flight.

It is well known that if the propeller of an aircraft engine is sheared off or broken during flight, the engine, having lost its load, will "run wild" and speed up to such an extent as to cause the engine to be ripped out of its mounting, thereby unbalancing the craft and rendering it uncontrollable by the pilot; or, if the engine is not completely dislodged, such a terrific vibration is set up in the aircraft structure as to cause structural failure of the fuselage, wings, struts, etc.

If the pilot is quick to perceive his dilemma and, knowing he has lost his propeller, immediately throttles the engine, he may avoid the damage mentioned above and may be able to land the aircraft safely. It has been found, however, that in many cases the pilot may not be immediately aware of what has happened and may not be able to immediately throttle the engine.

Accordingly, one of the objects of the invention is to provide novel means for automatically throttling an aircraft engine in an emergency such, for example, as when the propeller driven by the engine is sheared off or seriously damaged, whereby vibration and failure of the aircraft structure is prevented.

Another objects is to provide novel means rendered automatically operative to close the throttle of an aircraft engine upon failure of the propeller driven by said engine.

Another object of the invention is to provide, in combination with an aircraft engine having a throttle, novel means for automatically actuating said throttle and comprising means responsive to vibration of said engine, whereby said engine is automatically throttled when vibration of the engine becomes so excessive as to endanger the structure of the aircraft or the engine.

A further object is to provide novel electrical means controlled by vibration for automatically controlling the throttle of an aircraft engine in an emergency.

Still another object of the invention is to provide novel electrical means responsive to vibration for automatically closing the throttle of an aircraft engine when excessive vibration thereof occurs, as when the propeller is sheared off or otherwise seriously damaged, whereby structural failure of the aircraft or engine due to such vibration is prevented.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for purposes of illustration only and is not to be construed as defining the limits of the invention, reference being had for this purpose to the appended claims.

The single figure of the drawing is a more or less schematic illustration of one form of apparatus embodying the invention, certain of the principal elements being shown in section.

The invention consists substantially in the form, construction, combination, location and relative arrangement of parts for obtaining the results desired in accordance with the foregoing objects, as will be more fully hereinafter set forth in the specification, as shown in the drawing by way of example, and as finally pointed out in the claims.

Referring now to the drawing, there is shown an aircraft engine 1 driving a propeller 2 of an aircraft (not shown) and provided with fuel-supplying means such as a carburetor 3 controlled by a manually operable throttle lever 4 connected thereto by means of an actuating rod 5.

In accordance with the invention means are now provided for automatically controlling the fuel-supplying means or carburetor 3 by automatically actuating the rod 5 when excessive vibration of the engine 1 occurs, as when the propeller 2 is sheared off or is otherwise seriously damaged and the engine "runs wild," whereby the fuel supply is automatically decreased or is entirely cut off so as to slow down or stop the engine and, hence, its excessive vibration, thus preventing structural failure of the engine or the aircraft on which it may be mounted. In the form shown said means comprise a fluid pressure operated servo-motor constituted by a cylinder 6 having a piston 7 therein adapted to be actuated against a compression spring 6a and connected to the actuating rod 5 in any suitable manner as by means of a rack 8 formed on the piston rod 9 of the piston 7 and meshing with a gear sector 10 pivoted at 11.

Fluid pressure is supplied to the cylinder 6 in any suitable manner as by means of an air pump driven by the engine or by any means of producing fluid pressure or suction as indicated generically in the drawing. For this purpose the cylinder 6 of the servo-motor is connected to the fluid pressure source through a control valve 12 by means of pipes 13 and 14, the pressure, when applied, being in the direction indicated by the arrows.

In the illustrated embodiment, the control valve 12 comprises a cylinder 15 having a piston 16 therein provided with a transverse passage 17 extending therethrough and adapted, when the piston is moved upwardly against the pull of a tension spring 16a, to be aligned with pipes 13 and 14 to thereby transmit pressure to the servo cylinder 6.

In the position shown in the drawing, the valve 12 is closed because the passage 17 of the piston 16 is not in register with pipes 13 and 14.

In order that the throttle lever 4 may be actuated manually to control the carburetor 3 at times when the servomotor is not operating, a venting passage 18 is provided in the piston 16 of the valve 12 so that when said piston is in the position shown and the valve is closed, said passage 18 registers with pipe 14 and connects the cylinder 6 to atmospheric pressure. On the other side of the piston 7 the cylinder 6 is also in communication with the atmosphere through a vent 19. Thus, when valve 12 is closed and pressure to cylinder 6 is cut off, both sides of the piston 7 are at atmospheric pressure and, hence, it will not interfere with manual actuation of the throttle lever 4. When, however, the piston 16 is moved upwardly against the pull of tension spring 16a in a manner to be described later, the passage 17 falls in register with pipes 13 and 14 and pressure is transmitted to cylinder 6 to actuate piston 7 to the left, thereby closing the throttle.

Means are now provided for automatically actuating the piston 16 of valve 12 upwardly to bring the passage 17 in register with pipes 13 and 14. In the form shown, said means comprise a solenoid coil 20 connected in series with a pair of relatively movable contacts 21 and 22 which are normally open. The contact 22 is movable and is carried by a tuned vibrating reed 23 secured to the engine 1, said reed constituting a ground return for the electrical circuit as indicated at 24.

The contact 21 is stationary and is connected to one end of the solenoid coil 20 while the other end of said coil is connected to the positive side of a suitable source of electrical energy such as a battery 25. The negative side of the battery is connected to ground as indicated at 26. Thus, when contacts 21 and 22 are closed, current flows from battery 25 through coil 20, through said contacts 21, 22 to ground 24 and back to the battery via ground 26.

The piston 16 is provided with a piston rod 27 of magnetic material, which rod extends into and cooperates with the solenoid coil 20 so that upon energization of said coil the rod is pulled upwardly to actuate the piston 16 and open the valve 12 against the pull of tension spring 16a which causes the valve to close upon de-energization of the coil 20.

The reed 17 is tuned to a vibrating frequency substantially equal to a frequency just below the highest safe frequency of vibration that the engine 1 or its mounting or the aircraft structure can stand without causing damage thereto. Also, the movable contact 22 is so spaced that it will not engage the fixed contact 21 until the amplitude of vibration of the reed is at a maximum and just at the maximum amplitude of vibration that the engine and the surrounding structure can stand without damage.

It will, therefore, be seen that as long as vibration of the engine is not excessive, as in normal operation, the contacts 21 and 22 will remain open but as soon as the vibration becomes excessive, as when the propeller is sheared off or is seriously damaged, the reed 23 will vibrate to a maximum amplitude and close contacts 21 and 22, whereupon the solenoid coil will become energized and will actuate piston 16 upwardly against the pull of tension spring 16a to open valve 12, thereby transmitting pressure to cylinder 6 to cause actuation of the piston 7 and hence, the rod 5 through rack 8 and gear sector 10 to close the throttle automatically, thus stopping the excessive vibration and preventing structural failure of the engine and the aircraft on which it is mounted and permitting the pilot to land the craft safely. As soon as the vibration ceases or its amplitude decreases, the contacts 21—22 are opened and coil 20 de-energized, whereupon tension spring 16a pulls the piston 16 downwardly to close the valve 12.

Means are also provided whereby the automatic control may be overpowered manually by the pilot by actuating the throttle lever 4, if desired, particularly in an emergency when the pilot wants to suddenly take over the control of the engine even when the automatic control is operating, without having to first disconnect said automatic control. In the illustrated embodiment, said overpowering control comprises a connection between rod 5 and gear sector 10. The connection is made, as shown, by providing an extension 28 on the opposite end of sector 10. The extension 28 has an opening 29 therethrough through which the rod 5 is made to pass. Apertured retaining members in the form of collars 30 and 31 are provided around and rigidly secured to the rod 5, and between said collars 30 and 31 are interposed a pair of compression coil springs 32 and 33 which engage the extension 28 of the sector 10. Thus, the rod 5 can move the collars 30, 31 against springs 32, 33 and through the opening 29 when the lever 4 is actuated, without moving the sector 10 or otherwise disturbing the automatic control. When, however, the sector 10 is actuated by the piston 7 and rack 8, the extension 28 pushes against collar 30 or 31 through spring 32 or 33 to thereby actuate rod 5 in one direction or another to control the carburetor 3 automatically.

From the foregoing it will be seen that there are thus provided novel means for automatically controlling the throttle of an aircraft engine to reduce or cut off the fuel supply to the engine in an emergency such, for example, as when excessive vibration of the engine or its mounting occurs due to damage to the propeller driven by the engine, or due to other causes whereby excessive vibration occurs, thereby preventing structural failure of said engine, its mounting or the craft on which the engine is carried.

Although only one embodiment of the invention has been illustrated and described, various changes in the form, location and relative arrangement of the parts and circuit, which will now appear to those skilled in the art, may be made without departing from the spirit and scope of the invention. Reference is, therefore, to be had to the appended claims for a definition of the limits of the invention.

What is claimed is:

1. In combination, an aircraft engine, a propeller driven by said engine, means for supplying fuel to said engine, manually operable means for regulating said fuel-supplying means, a servo-motor for actuating said fuel-supplying means, electrical means including a solenoid for controlling said servo-motor, and vibration-responsive means rendered automatically operative to actuate said solenoid during higher than normal vibration due to failure of said propeller.

2. In combination, an aircraft engine, a propeller driven by said engine, means for supplying fuel to said engine, manually operable means for regulating said fuel-supplying means, and automatic means for actuating said fuel-supplying means to reduce the amount of fuel supplied to said engine, said automatic means comprising a fluid pressure actuated servo-motor connected to said fuel-supplying means, a valve for controlling a supply of fluid pressure to said servo-motor, an electric circuit including a source of electrical energy and a solenoid for actuating said valve, and means responsive to deviation of the vibrations of said engine from normal produced upon damage to or failure of said propeller for controlling said electric circuit to operate said valve.

3. In combination, an aircraft engine, a propeller driven by said engine, means for supplying fuel to said engine, manually operable means for regulating said fuel-supplying means, and automatic means for actuating said fuel-supplying means to reduce the amount of fuel supplied to said engine, said automatic means comprising a fluid pressure actuated servo-motor connected to said fuel-supplying means, a valve for controlling a supply of fluid pressure to said servo-motor, an electric circuit including a source of electrical energy and a solenoid for actuating said valve, and means responsive to vibrations of said engine varying from normal produced upon damage to or failure of said propeller for controlling said electric circuit to operate said valve, said vibration-responsive means comprising a tuned vibrating reed mounted on said engine, and a pair of relatively movable contacts adapted to be closed by said vibrating reed when its amplitude of vibration reaches a predetermined maximum.

4. In combination, an aircraft engine, a propeller driven by said engine, means for supplying fuel to said engine, manually operable means for regulating said fuel-supplying means, and automatic means for actuating said fuel-supplying means to reduce the amount of fuel supplied to said engine, said automatic means comprising a fluid pressure actuated servo-motor connected to said fuel-supplying means, a valve for controlling a supply of fluid pressure to said servo-motor, an electric circuit including a source of electrical energy and a solenoid for actuating said valve, means responsive to deviation of the vibrations of said engine from normal produced upon damage to or failure of said propeller for controlling said electric circuit to operate said valve, and means for overpowering said automatic means by said manually operable means.

5. In combination, an aircraft engine, a propeller driven by said engine, means for supplying fuel to said engine, manually operable means for regulating said fuel-supplying means, and automatic means for actuating said fuel-supplying means to reduce the amount of fuel supplied to said engine, said automatic means comprising a fluid pressure actuated servo-motor connected to said fuel-supplying means, a valve for controlling a supply of fluid pressure to said servo-motor, an electric circuit including a source of electrical energy and a solenoid for actuating said valve, means responsive to deviation of the vibrations of said engine from normal produced upon damage to or failure of said propeller for controlling said electric circuit to operate said valve, said vibration-responsive means comprising a tuned vibrating reed mounted on said engine, and a pair of relatively movable contacts adapted to be closed by said vibrating reed when its amplitude of vibration reaches a predetermined maximum, and means for overpowering said automatic means by said manually operable means.

CHARLES MARCUS.